INVENTORS
WALTER MEHLO
MANFRED HOHMANN
BY
James E. Bryan
ATTORNEY

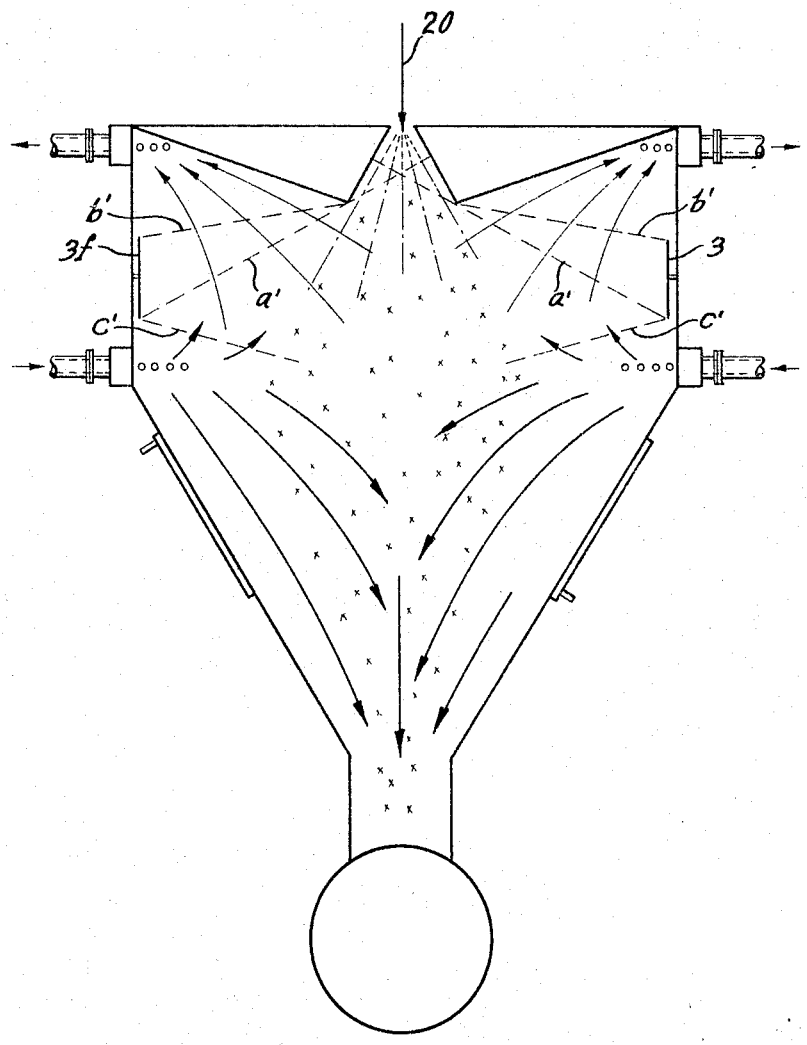

United States Patent Office 3,269,451
Patented August 30, 1966

3,269,451
SPRAY DRYING PROCESS AND APPARATUS THEREFOR
Walter Mehlo, Wiesbaden-Biebrich, and Manfred Hohmann, Wiesbaden-Schierstein, Germany, assignors to Kalle Aktiengesellschaft, Wiesbaden-Biebrich, Germany, a corporation of Germany
Filed Oct. 10, 1963, Ser. No. 315,291
Claims priority, application Germany, Oct. 12, 1962, K 47,951
12 Claims. (Cl. 159—4)

This invention relates to a process for the manufacture of solvent-free powders by spray drying a solution and/or suspension with irradiation using a separating gas current, and to an apparatus for use therein.

For drying purposes, there has already been proposed apparatus in which the solution to be dried is sprayed through a nozzle into a drying chamber, while at the same time injecting in the same direction a current of gas heated at a more or less high temperature, whereby the solvent is evaporated. The current of gas and the particles freed from solvent, in conjunction with the solvent vapors, are fed into a separating device, for example a cyclone.

The disadvantage of this prior method is that the whole of the solvent vapors must be transported together with the particles which were initially dissolved in the solvent. Accordingly when the resulting mixture cools, the particles once more absorb solvent vapors and the material tends to form lumps which detract from the object of the operation and may in addition block the separating vessels. In some cases, this disadvantage can be partially overcome by increasing the amount of hot air used, but this entails a very undesirable increase in the amount of heat consumed. Furthermore, there is a risk that the product to be dried will be damaged because in such a case the whole of the additional heat increases the sensible heat of the product.

Apparatus is also known in which, in addition to the features referred to above, radiation of heat is effected into the spray zone so that, in addition to the warm current of gas which acts only on the surface of the atomized droplets, the particles themselves are also heated, thereby producing a drying effect from inside the particles. This type of apparatus is likewise incapable of overcoming the disadvantages referred to above.

Together with these one-current spray driers, two-current driers have been proposed in which, for example, the atomized solution, in admixture with a current of cold gas, is contacted in countercurrent flow to hot air which causes evaporation of the solvent, and the solvent vapors are removed by means of an exhauster together with the cold gas injected in countercurrent flow. The dried particles overcome the suction current of air by their own weight, whereupon they fall into a funnel-shaped separating device.

The last-mentioned apparatus has the disadvantage that it can be used only in cases where heavy and compact particles are formed which are capable of overcoming the countercurrent flow of air by their own weight.

Furthermore, apparatus has been proposed in which the dissolved material is not atomized but the solution is introduced dropwise into a one-current drier. Against the solution particles, there is injected, under high pressure, a current of cold air which atomizes the drops of liquid and converts the solvent at a very low temperature into the vapor state. A disadvantage in this case is that an apparatus of this design must be very large in the vertical direction and substantial amounts of air must be injected and exhausted. Apparatus of this type, which is very expensive to manufacture, has therefore proved its value only when used in very special drying processes, i.e., for drying fruit juices and milk, substances that are highly sensitive to elevated temperatures.

The present invention provides a spray drying process with irradiation, using a separating gas current, wherein a solution and/or dispersion is sprayed into a drying zone, the liquid is then vaporized by radiant heat, beyond the vaporization zone a gas current is injected, in the direction of the resulting spray, the gas current together with the dried particles is discharged and the solvent is removed between the spray zone and the gas inlet, preferably between the spray zone and the drying zone.

The invention also provides an apparatus for use in the process described, comprising a preferably elongated container including an atomizer, a heater and gas supply and withdrawal means, the atomizer being so mounted that the heat radiated by the heater can at most have only a very minor effect upon it, the heater producing only a very limited heating zone, gas inlet means preferably directing the current of gas evenly over the entire interior surface of the container and being located on the opposite side of the heater from the atomizer, at least one exhaust outlet means being located between the atomizer and the gas inlet, preferably between the atomizer and the heater, and at least one outlet being provided for the dried, atomized material and the injected gas.

Using the process and apparatus of the invention, it is possible to achieve a very substantial degree of separation of the solvent vapors from the dried particles. The dried material no longer comes into any significant degree of contact with the solvent vapors during cooling or separation, whereby subsequent superficial dissolution and lump formation is prevented. This is especially noticeable in the case of lyoscopic substances. Furthermore, the drying zone may be made substantially smaller so that the apparatus becomes very compact. Also, the present invention ensures better utilization of the drying energy supplied since only small amounts of air and/or gas need be heated. Moreover, the necessary heating is moderate. Compared with known devices, a substantially greater throughput for identical grain sizes is achieved.

The process of the invention may be described in more detail as follows:

The atomizing zone, i.e. the zone in which a continuous stream of liquid is converted into a mist, i.e. a finely dispersed liquid, is shielded from the zone of the direct action of the heater, for example by providing, in a cover of the apparatus and in the direction of the rays of the infra-red radiators attached to the side wall, internally projecting shielding means surrounding the atomizing zone. This feature ensures that the liquid, which at this point has not yet been completely atomized, is not prematurely heated. This is important since when heat rays strike the liquid prematurely, the particles dry superficially to a certain degree and can not then be completely atomized, so the quality of the atomized material is adversely affected. Only when the solution to be dried is in its final, extremely fine state of dispersion, is it acted upon by the heat rays. The massive heat action upon the large surface resulting from the fine state of dispersion ensures that the solvent is completely evaporated in a minimum time, whereupon the solid particles are separated from the solvent vapors.

This is achieved by injecting, beyond the radiation zone, a gas current which conveys the solid particles, through the action of an exhauster, to the end of the drying installation where they drop into a receiving device. At the same time, part of this gas current promotes the natural thermal upward flow of the heated solvent vapors which are formed above the gas inlet, accompanied by an increase in volume. The removal of the vapors can be assisted by providing a suitable exhausting means. This separating gas cushion ensures, without the use of mechanical means, the separation of the solid particles from the solvent vapors in opposite directions.

When an expensive solvent is used, a further operation outside the apparatus may follow to recover the solvent. The solid particles, such as may have been deposited by the gas current in a cyclone, are thus separated from the solvent vapors and do not tend to form lumps.

One embodiment of the apparatus of the invention is illustrated in the accompanying drawings in which:

FIGURE 2 is a similar view showing flow characteristics.

Figure 1:
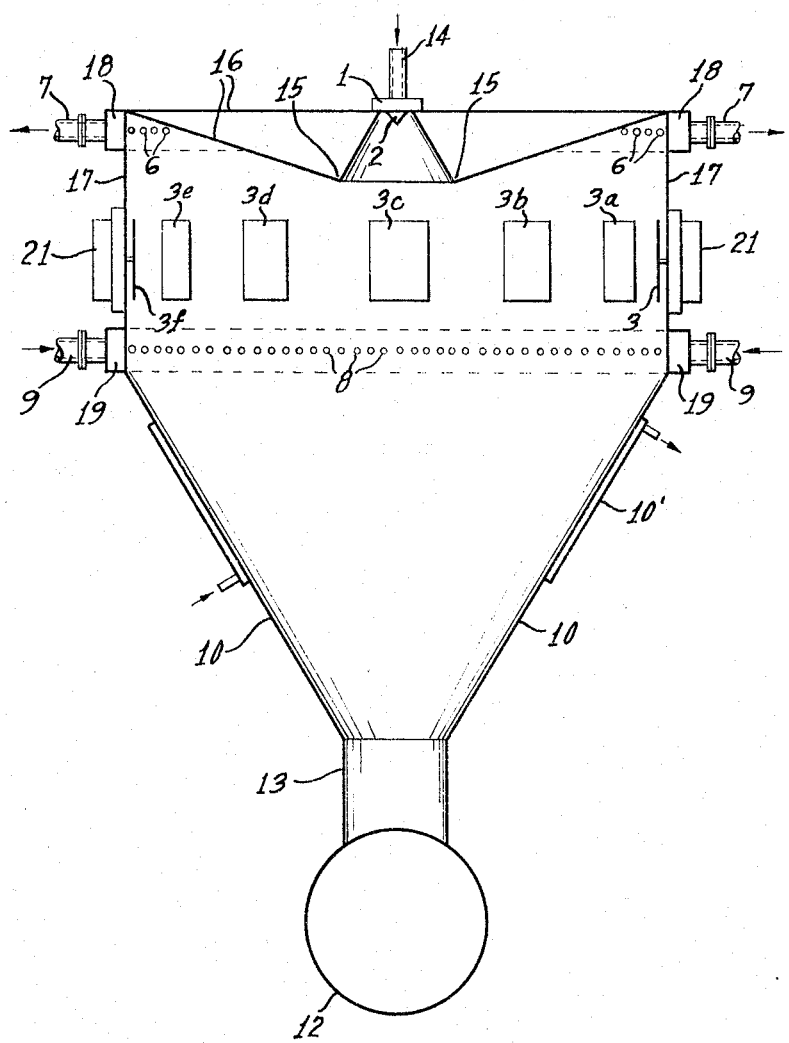
FIGURE 1 is a view in elevation, in vertical section.

Referring to FIGURE 1 of the drawings, a solution and/or dispersion is supplied to the apparatus through a duct 14 by suction or under pressure. An atomizer 1 with atomizing nozzles 2 injects the stream of liquid centrally into the apparatus. By means of an annular, downwardly inclined depression 15 in the top cover 16, these nozzles are shielded from the direct influence of heat rays emitted by the infra-red radiators described below. The cover 16 is supported by a side wall 17 which has at the base thereof a funnel-shaped portion 10 surrounded by a cooling jacket 10' and having a tubular outlet 13.

Two groups of openings are provided in the side wall 17 to enable gases to be injected and removed. Outlet openings 6 are disposed around the top of the side wall and lead into an annular chamber 18 connected to one or more exhaust ducts 7 leading to an exhaust fan (not shown).

Below the annular chamber 18, there is provided on the side wall 17 a series of infra-red radiators, of which those designated 3 to 3f appear in FIGURE 1, which radiators emit their rays within a narrow angle in a direction towards the downward flow of the stream of material. Furthermore, there are provided on the outside of the wall 17 high-frequency generators 21 which are used when a high-frequency field is capable of influencing the solution so as to achieve a drying effect. The field of action of these high-frequency generators is restricted so that only the solution itself is heated.

Below the aforementioned infra-red radiators, annular gas inlet openings 8 are provided in communication with one another by means of an annular distributor ring 19 and gas is fed in through one or more inlet ducts 9. The outlet 13 connects to a receiving device 12.

Referring to FIGURE 2 of the drawings, the solution or dispersion enters the atomizer at 20 and is atomized in a divergent path, as indicated by the dashed lines, without being affected by the direct radiant heat emitted by the infra-red radiators (in FIGURE 2 only radiators 3 and **3*f*** are shown), the extreme boundary of which is shown by the lines *a′*. Below these lines, the atomized solution then enters the field of the infra-red rays, the main effective angle of which is approximately bounded by the lines *b′* and *c′*. In this zone, the atomized solution, and any solids dispersed therein, absorbs heat rays, which produces a uniform heating effect. In this manner, the solvent or dispersing agent evaporates rapidly and completely.

The thermal upward flow of the solvent vapors causes them to rise (note the thin, long arrows) and at the top they escape or are exhausted through the outlet openings, in the directions of the horizontal arrows, and thus are removed from the apparatus. This removal of the vapors is assisted by the gases (short arrows) entering through the inlet openings. The dried particles thus freed from solvent or dispersing agent are caught below the radiation zone by inflowing downwardly directed gas (heavy arrows), for example air or a protective gas, and conveyed into the exhauster and separator. Only a small proportion of the inflowing air is drawn upwardly to promote the separation of the solvent vapors from the dried particles as described. The actual conditions, more especially the amount of inflowing air, can be substantially controlled by valve means which may be provided at the gas inlets and/or at the gas outlets or exhaust outlets.

The process and apparatus of the invention may be used for treating solutions or dispersions. As solutions, any industrial solutions requiring spray drying may be treated. The substances dissolved may be inorganic or organic; the nature of the solvent is immateral. Particularly suitable are, of course, readily volatile solvents such as alcools or chlorinated hydrocarbons. Water is also a suitable solvent. When inflammable liquids or solvents are used that form explosive mixtures with air, the process must be performed using an inert gas, such as nitrogen. A dispersing agent, when used, may be any of the usual surfactants.

All conventional atomizers may be used in the present method. Advantageous results are obtained with installations having a relatively short atomizing zone. The requirements are best satisfied by single component nozzles, although it is also possible to use two-component nozzles as conventionally employed in industry. Combinations of nozzles of different types can also be used.

The apparatus cover or top may have any desired shape provided it satisfies the following conditions: It must not allow the infra-red rays to act on the atomized material before the atomizing process has been completed, i.e., the rays may act only when the dispersion of the liquid is completed. This can be ensured, for example, by making an annular depression in the cover or by providing suitable deflectors; or, if desired, the external face of the cover may be cooled in order to prevent an excessive build-up of heat by direct action of the heat rays.

The cover or top is advantageously made from a metal which reflects infra-red rays, such as sheet aluminum or chromium plated sheet iron. These materials preferably are used for the entire shell of the apparatus.

The aforementioned gas exhausting arrangement is advantageously provided a short distance below the point where the cover joins the body of the apparatus. This arrangement includes a number of circular openings in the side wall. The size, shape and number of the individual openings are not critical, but they should be such that uniform exhausting is ensured. These openings lead into a discharge or exhaust channel which permits the gas removal to proceed under uniform conditions. Control means may be provided in this discharge channel which enable the rate of exhaust to be varied. Likewise, suction devices may be connected with the discharge channel.

The shape of the apparatus as a whole is not critical, but it must be ensured that the diameter of the irradiation zone is adapted to the range of the heating installation. It is of advantage to taper the shell in the direction of the receiver or separator 12.

As the receiver or separator, there may be used any apparatus generally used in industry for this purpose. In most cases a cyclone will suffice.

When the installation of the invention is to be operated continuously, there may be associated with it means for continuously withdrawing or discharging the pulverulent final product.

It will be obvious to those skilled in the art that many modifications may be made within the scope of the present invention without departing from the spirit thereof, and the invention includes all such modifications.

What is claimed is:

1. A spray-drying process which comprises atomizing a liquid-containing material to be dried and flowing downwardly, subjecting the atomized material to radiant heat in a heating zone to form a mixture of vapors and solid particles, and contacting the mixture downstream from the heating zone with a gas current, a minor portion of which flows upwardly with the vapors and a major portion of which flows downwardly with the solid particles.

2. A process according to claim 1 in which the liquid-containing material is a solution.

3. A process according to claim 1 in which the liquid-containing material is a dispersion.

4. A process according to claim 1 in which the atomized material is subjected to radiant heat while passing downwardly and is contacted with a gas current introduced laterally.

5. A process according to claim 1 in which the vapors are removed above the heating zone.

6. A process according to claim 1 in which the material is protected from radiant heat during atomizing.

7. A spray-drying apparatus comprising a housing, atomizing means mounted in the upper portion of the housing directing downwardly material to be dried, heat-radiating means mounted in the housing below the atomizing means, means for introducing a gas into the housing below the heat-radiating means, means located above the heat-radiating means for withdrawing vapor from the housing, and means in the lower portion of the housing for withdrawing solid material and gas.

8. An apparatus according to claim 7 in which means are included for shielding the atomizing means from radiant heat.

9. An apparatus according to claim 7 in which the heat-radiating means is at least one infra-red radiator.

10. An apparatus according to claim 7 in which the means for introducing the gas is a plurality of apertures in the housing which connect to an annular channel.

11. An apparatus according to claim 7 in which the means for withdrawing vapor is a plurality of apertures in the housing which connect to an annular channel.

12. An apparatus according to claim 7 in which the means for withdrawing solid material and gas is a cyclone.

References Cited by the Examiner

UNITED STATES PATENTS

| | | | |
|---|---|---|---|
| 806,747 | 12/1905 | McLachlan | 159—4 X |
| 1,133,051 | 3/1915 | Merrell | 159—4 X |
| 1,166,225 | 12/1915 | Krause | 159—48. |
| 1,829,477 | 10/1931 | Douthitt | 159—4 |
| 1,877,648 | 9/1932 | Douthitt | 159—4 |
| 2,344,754 | 3/1944 | Vang | 34—1 |
| 2,473,539 | 6/1949 | Merriam | 34—1 |
| 2,699,822 | 1/1955 | Jehlicka | 159—4 |
| 2,842,193 | 7/1958 | Ballestra | 159—4 |
| 2,873,799 | 2/1959 | Earley et al. | 159—49 |
| 2,953,457 | 9/1960 | Sanna | 99—56 |

FOREIGN PATENTS

| | | |
|---|---|---|
| 986,238 | 7/1951 | France. |

OTHER REFERENCES

Chemical Eng. Handbook by J. H. Perry, 3rd edition, McGraw-Hill (1950) Figure 40, page 842.

NORMAN YUDKOFF, *Primary Examiner.*

J. SOFER, *Assistant Examiner.*